(12) United States Patent
Chen et al.

(10) Patent No.: US 11,583,129 B2
(45) Date of Patent: Feb. 21, 2023

(54) POUR OVER COFFEE MAKER WITH TDS MEASUREMENT

(71) Applicant: EnE Holdings Ltd, Hong Kong (CN)

(72) Inventors: Yuen Chin Andrew Chen, Hong Kong (CN); Wai Ming Raymond Wong, Hong Kong (CN); Chui Wa Alfie Lau, Hong Kong (CN); Pui Yin Amy Decem Cheng, Hong Kong (CN); Kok Leong Jeremy Tay, Hong Kong (CN)

(73) Assignee: EnE Holdings Ltd, Hong Kong (CN)

( * ) Notice: Subject to any disclaimer, the term of this patent is extended or adjusted under 35 U.S.C. 154(b) by 744 days.

(21) Appl. No.: 16/494,782

(22) PCT Filed: Mar. 16, 2018

(86) PCT No.: PCT/IB2018/051771
§ 371 (c)(1),
(2) Date: Sep. 17, 2019

(87) PCT Pub. No.: WO2018/167729
PCT Pub. Date: Sep. 20, 2018

(65) Prior Publication Data
US 2020/0022527 A1    Jan. 23, 2020

Related U.S. Application Data

(60) Provisional application No. 62/472,654, filed on Mar. 17, 2017.

(51) Int. Cl.
*A47J 31/02*    (2006.01)
*A47J 31/41*    (2006.01)
(Continued)

(52) U.S. Cl.
CPC .............. *A47J 31/02* (2013.01); *A47J 31/41* (2013.01); *A47J 31/4403* (2013.01); *A47J 31/46* (2013.01);
(Continued)

(58) Field of Classification Search
CPC .... A47J 31/02; A47J 31/5253; A47J 31/4403; A47J 31/46; A47J 2031/0694;
(Continued)

(56) References Cited

U.S. PATENT DOCUMENTS

2007/0119308 A1* 5/2007 Glucksman ......... A47J 31/4478
99/275
2010/0085560 A1* 4/2010 Fedele ................ G01N 21/43
356/134

FOREIGN PATENT DOCUMENTS

| CN | 102869291 A | 1/2013 |
| CN | 204318275 U | 5/2015 |
| CN | 204995222 U | 1/2016 |

OTHER PUBLICATIONS

Jul. 3, 2018 PCT International Search Report, International Application No. PCT/IB2018/051771.
(Continued)

*Primary Examiner* — Phuong T Nguyen
(74) *Attorney, Agent, or Firm* — Law Offices of Albert Wai-Kit Chan, PLLC

(57) ABSTRACT

This invention provides a coffee maker having: an upper structure with a filter (1) and a measurement chamber (2); the measurement chamber (2) has TDS sensor (8), a temperature sensor (9) and a fluid transfer system (7); a lower structure with a weight sensor (52); a plurality of connecting elements (4) enacting the upper structure above the lower structure; and carafe (6) to be placed between the upper structure and lower structure; and a display panel (51)

(Continued)

showing data from the TDS sensor, temperature sensor, or weight sensor.

10 Claims, 7 Drawing Sheets

(51) Int. Cl.
    *A47J 31/52*           (2006.01)
    *A47J 31/44*           (2006.01)
    *A47J 31/46*           (2006.01)
    *A47J 31/56*           (2006.01)
    *A47J 31/06*           (2006.01)

(52) U.S. Cl.
    CPC ............ *A47J 31/5253* (2018.08); *A47J 31/56* (2013.01); *A47J 2031/0694* (2013.01)

(58) Field of Classification Search
    CPC ...... A47J 31/56; A47J 31/3671; A47J 31/469; A47J 31/30; A47J 31/467; A47J 31/002; A47J 31/545; A47J 32/402; A47J 31/06; A47J 31/41
    USPC .......... 99/275, 280, 281, 288, 290, 295, 306
    See application file for complete search history.

(56) References Cited

OTHER PUBLICATIONS

Jul. 3, 2018 PCT Written Opinion of the International Searching Authority, International Application No. PCT/IB2018/051771.

\* cited by examiner

US 11,583,129 B2

POUR OVER COFFEE MAKER WITH TDS MEASUREMENT

FIELD OF THE INVENTION

This invention relates to coffee makers, particularly, coffee maker for brewing coffee with repeatable taste profile.

BACKGROUND OF THE INVENTION

Currently, there is no coffee makers that could produce different batches of coffee having the same quality. Total Dissolved Solids (TDS) is a measure of the combined content of all substances contained in a liquid in suspended form. Accordingly, measuring TDS of coffee is reflective of the level of extraction of coffee. The most common way to measure coffee TDS value is by TDS sensor such as those offered by VST. These usually require a sample of brewed coffee to be removed and placed into a well in the system. As such, a small device, e.g. syringe or dropper, must be dipped into a cup of brewed coffee which may lead to a user's bad perception e.g. contamination of the coffee. Extra effort must be spent in washing as the TDS sensor will have to be washed separately from the coffee brewer. In order for TDS value to be correlated with the level of extraction, the weight of both water and coffee ground used must be measured by a separate device and recorded.

To overcome the limitations of the existing TDS sensors, this invention provides a single pour over coffee maker having weight, temperature and TDS measuring functions.

SUMMARY OF THE INVENTION

In one embodiment, this invention provides a coffee maker comprising: an upper structure comprising a filter (1) and a measurement chamber (2); the measurement chamber (2) comprises a TDS sensor (8), a temperature sensor (9) and a fluid transfer. system (7); a lower structure comprising a weight sensor (52); a plurality of connecting elements (4) enacting the upper structure above the lower structure; and a carafe (6) to be placed between the upper structure and lower structure; and a display panel (51) showing data from the TDS sensor, temperature sensor, or the weight sensor.

In another embodiment, this invention provides a coffee maker comprising a filter holder (3) connected to a lower structure (5) via a plurality of connecting elements (4) such that the filter holder is enacted above the lower structure, the lower structure comprises a display; a measurement chamber (2) positioned on and supported by the filter holder, comprising (i) a fluid transfer system comprising a tube (71) traversing the bottom of the measurement chamber, (ii) a TDS meter, and (iii) a temperature sensor; and a carafe (6) configured to be placed on the lower structure so that the carafe is positioned under the measurement chamber.

In one embodiment, this invention further provides a method to obtain TDS value of a brewed coffee for using the coffee maker of this invention. The method comprises the steps of: adding an amount of coffee ground to the filter, the amount of coffee ground is measured by the weight sensor; adding an amount of hot water to the filter to form brewed coffee, the amount of hot water is measured by the weight sensor; and allowing the brewed coffee to flow through the fluid transfer system for the TDS sensor and the temperature sensor to make measurement; and displaying a TDS value of the brewed coffee on display panel.

In another embodiment, this invention provides method of making coffee with repeatable TDS value using the coffee maker of this invention, comprising the steps of: adding a specified amount of coffee ground by weight to the filter according to a value shown by the display of the coffee maker; adding a specified amount of hot water to the filter according to a value shown by the display of the coffee maker; and collecting coffee from the measurement chamber of the coffee maker with a TDS value as shown by the display.

DETAILED DESCRIPTION OF THE INVENTION

Figure 1:
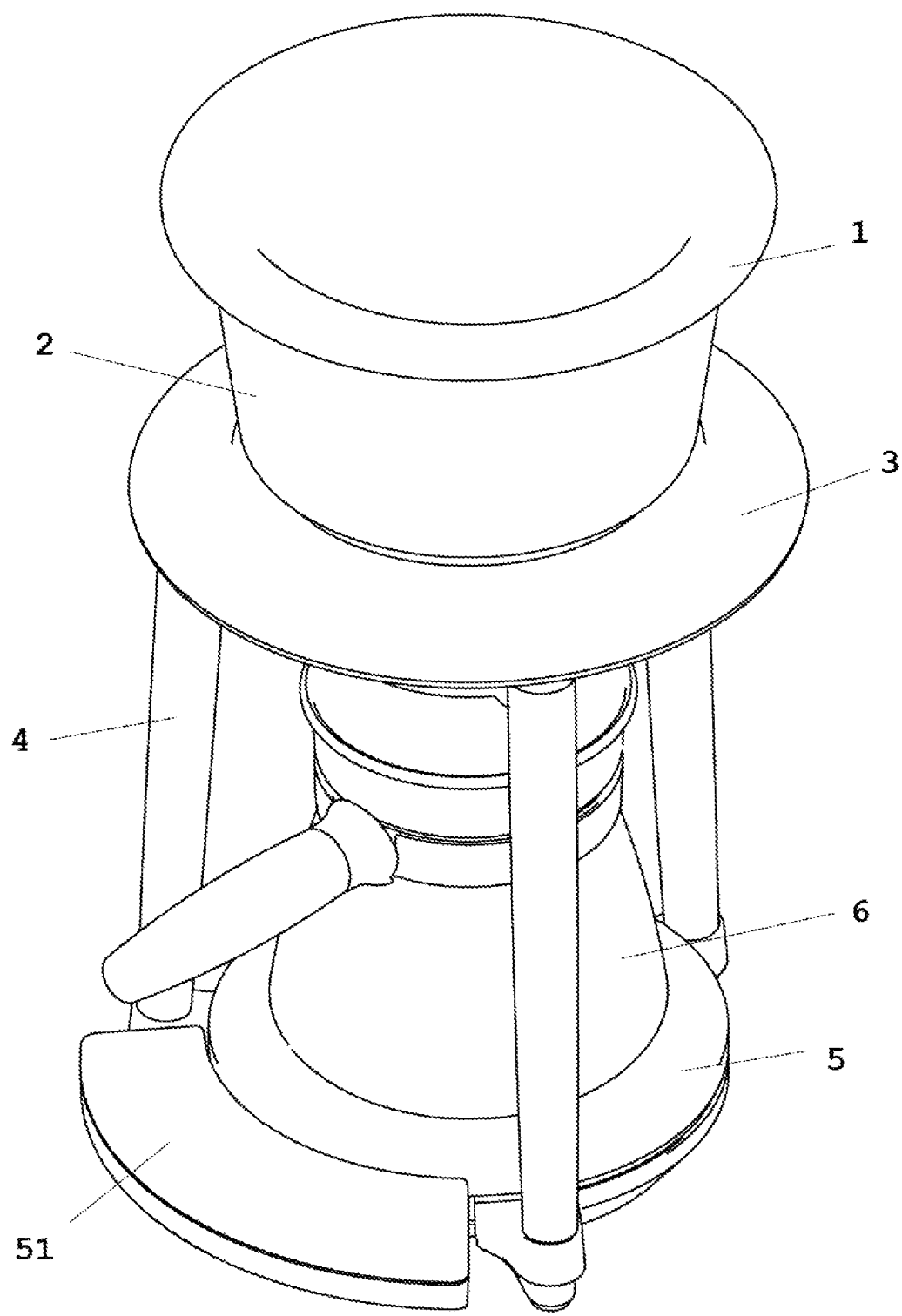
FIG. 1 shows the isometric view of an embodiment of this invention having a filter (1), a measurement chamber (2), a filter holder (3), three connecting elements (4) and a lower structure (5) with display panel (51). A carafe (6) is placed on the lower structure (5) to receive brewed coffee.

This invention provides a coffee maker for producing coffee having repeatable taste profile.

In one embodiment, the coffee maker of this invention comprises an upper structure comprising: (a) a filter enclosed in a case; and (h) a measurement chamber underneath the filter, the measurement chamber comprises a Total Dissolved Solids (TDS) sensor and a fluid transferring system for transferring fluid out of the measurement chamber; a lower structure comprising a weight sensor; at least one connecting element; and a digital display for showing readings from the TDS sensor and the weight sensor; wherein the upper structure is connected to the lower structure via at least one connecting element. In another embodiment, the coffee maker comprises a temperature sensor in the measurement chamber. In a further embodiment, any change in weight of the upper structure is detected by the weight sensor. In yet another embodiment, the lower structure has a flat surface to accommodate a carafe or cup.

In one embodiment, the TDS sensor measures TDS value by conductivity. In another embodiment, the TDS sensor comprises two vertical pins parallel to each other. The two pins will be fully submerged in brewed coffee in the measurement chamber during conductivity measurement. In a further embodiment, the TDS sensor is a refractometer.

In one embodiment, the case enclosing the filter is made of a transparent material.

In one embodiment, the measurement chamber comprises wall made of a transparent material.

In one embodiment, the fluid transferring system comprises a siphon. In another embodiment, the fluid transfer system comprises a tube traversing the bottom of the measurement chamber. A section of the tube protrudes into the measurement chamber so that brewed coffee must accumulate to a volume in the measurement chamber before overflowing into the tube and leaves.

In one embodiment, the temperature sensor is for calibrating the TDS sensor. In another embodiment, the temperature sensor is for real time monitoring of temperature.

In one embodiment, the measurement chamber is used to accumulate sufficient coffee for accurate and continuous measurement by the TDS sensor and/or temperature sensor.

In one embodiment, the upper structure is detachable from the coffee maker. In another embodiment, the electrical components in the upper structure re-establish electrical contact with coffee maker via at least one connector. In further embodiment, the at least one connector is a pogo pin.

In one embodiment, the lower structure comprises a control board. In another embodiment, the control board comprises a timer. In a further embodiment, the digital display shows one or more of the outputs of the timer, TDS value, weight and taste result.

In one embodiment, the at least one connecting element is made of one or more of wood, stainless steel, or glass.

In one embodiment, the control board further comprises a WiFi module for communicating with a wirelessly connected device. In a further embodiment, the wirelessly connected device is a smart device. In another embodiment, the coffee maker of this invention is coupled with a software to be installed on the wirelessly connected device for a user to share the pouring experience so that it can be repeated by another user. In yet another embodiment, the software tabulates the taste profile of a brewed coffee automatically upon receiving data from the control board such as TDS value, weight, time etc.

In one embodiment, hot water can be poured into the filter manually or automatically. In another embodiment, when hot water is poured automatically, the upper structure further comprises a hot water tank above the filter. In a further embodiment, the hot water tank releases water to the filter at a specified temperature.

In one embodiment, this invention provides a method for making coffee with repeatable taste profile using the coffee maker in this invention, comprising the steps of: selecting a coarseness of coffee ground being used; adding a specified amount of coffee ground by weight to the filter according to a value shown by the digital display; adding a specified amount of hot water to the filter according to a value shown by the digital display; and collecting coffee from the measurement chamber with a TDS value as shown by the digital display, the TDS value is a quantifiable value to measure and assess the taste profile of the coffee.

In another embodiment, the method comprises: taring the weight sensor; selecting the coarseness of the coffee ground being used; adding a specified amount of coffee ground by weight to the filter by observing the digital display; taring the weight sensor; adding a specified amount of hot water by weight to the filter by observing the digital display; reading a TDS value from the digital display; and collecting a coffee having the TDS value from the lower structure.

In one embodiment, consumer will translate TDS valve to the taste of the coffee.

In one embodiment, consumer can share the drinking experience and taste profile of the coffee of a particular TDS value online.

In one embodiment, TDS value could be repeated once the coarseness of a coffee grind, amount of coffee ground, and amount of water is known.

In one embodiment, this invention provides a coffee maker comprising: an upper structure comprising a filter (1) and a measurement chamber (2; the measurement chamber (2) comprises a TDS sensor (8), a temperature sensor (9) and a fluid transfer system (7); a lower structure comprising a weight sensor (52); a plurality of connecting elements (4) enacting the upper structure above the lower structure; and a carafe (6) to be placed between the upper structure and lower structure; and a display panel (51) showing data from the TDS sensor, temperature sensor, or weight sensor.

In one embodiment, the upper structure further comprises a filter holder, the filter and measurement chamber are detachable from the filter holder, the filter holder and the measurement chamber establish electrical contact by a connector.

In one embodiment, the connector is a pogo pin.

In one embodiment, the fluid transfer system comprises a tube traversing the bottom of the measurement chamber and protruding a segment into the measurement chamber, wherein the segment has a height higher than the TDS sensor.

In one embodiment, the measurement chamber further comprises a case (72) for housing the TDS sensor, the temperature sensor and the fluid transfer system.

In one embodiment, the TDS sensor comprises two parallel pins for measuring conductivity.

In one embodiment, the IDS sensor is a refractometer.

In one embodiment, the temperature sensor is a NIC.

In one embodiment, the fluid transfer system comprises a siphon.

In one embodiment, the lower structure comprises a display panel.

In one embodiment, the coffee maker of this invention further comprises a wireless communication module for communicating with a wirelessly connected device.

In one embodiment, this invention further provides a method for obtaining TDS value of a brewed coffee with the coffee maker of this invention, comprising the steps of: adding an amount of coffee ground to the filter, the amount of coffee ground is measured by the weight sensor; adding an amount of hot water to the filter to form brewed coffee, the amount of hot water is measured by the weight sensor; and Allowing the brewed coffee to flow through the fluid transfer system for the TDS sensor and the temperature sensor to make measurement; and displaying a TDS value of the brewed coffee on display panel.

In one embodiment, this invention provides a coffee maker comprising a filter holder (3) connected to a lower structure (5) via a plurality of connecting elements (4) such that the filter holder is enacted above the lower structure, the lower structure comprises a display; a measurement chamber (2) positioned on and supported by the filter holder, wherein the measurement chamber comprises (i) a fluid transfer system comprising a tube (71) traversing the bottom of the measurement chamber, (ii) a TDS meter, and (iii) a temperature sensor; and a carafe (6) configured to be placed on the lower structure so that the carafe is positioned under the measurement chamber.

In one embodiment, the lower structure comprises a weight sensor (52).

In one embodiment, the display is configured to display outputs of a weight sensor.

In one embodiment, the display is configured to display outputs of the temperature sensor and TDS meter.

In one embodiment, the lower structure comprises a control board.

In one embodiment, the control board comprises a WiFi module for communicating with a wirelessly connected device.

In one embodiment, the buffer tank is configured to hold a filter.

In one embodiment, the buffer tank is made of a transparent material.

In one embodiment, a section of the tube (71) protrudes into the measurement chamber so that brewed coffee must be accumulated to a volume in the measurement chamber before overflowing into the tube and leaving the measurement chamber.

In one embodiment, the measurement chamber is used to accumulate sufficient coffee for accurate and continuous measurement by the TDS meter and the temperature sensor.

In one embodiment, the buffer tank is detachable from the coffee maker.

In one embodiment, the connecting elements are made of wood, stainless steel or glass.

In one embodiment, this invention provides a method of making coffee with repeatable TDS value using the coffee maker of this invention, comprising the steps of: adding a specified amount of coffee ground by weight to the filter basket according to a value shown by the display of the coffee maker; adding a specified amount of hot water to the filter basket according to a value shown by the display of the coffee maker; and collecting coffee from the measurement chamber of the coffee maker with a TDS value as shown by the display.

The invention will be better understood by reference to the Example which follows, but those skilled in the art will readily appreciate that the specific examples are for illustrative purposes only and should not limit the scope of the invention which is defined by the claims which follow thereafter.

It is to be noted that the transitional term "comprising", which is synonymous with "including", "containing" or "characterized by", is inclusive or open-ended and does not exclude additional, un-recited elements or method steps.

EXAMPLE

FIG. 1 shows an embodiment of the coffee maker with TDS measurement. The coffee maker comprises filter (1), measurement chamber (2), a filter holder (3), three connecting elements (4) and a lower structure (5). A carafe (6) is placed on the lower structure (5) to receive brewed coffee. The filter can be made of ceramic, metal or other materials while the measurement chamber can be made of a transparent material for viewing of the brewed coffee from the side. The lower structure (5) may comprise a panel (51) for controlling the coffee maker or displaying data. Coffee ground is placed onto a filter paper and into filter (1). Hot water is then poured into the filter to percolate the coffee ground to form brewed coffee.

Figure 2:
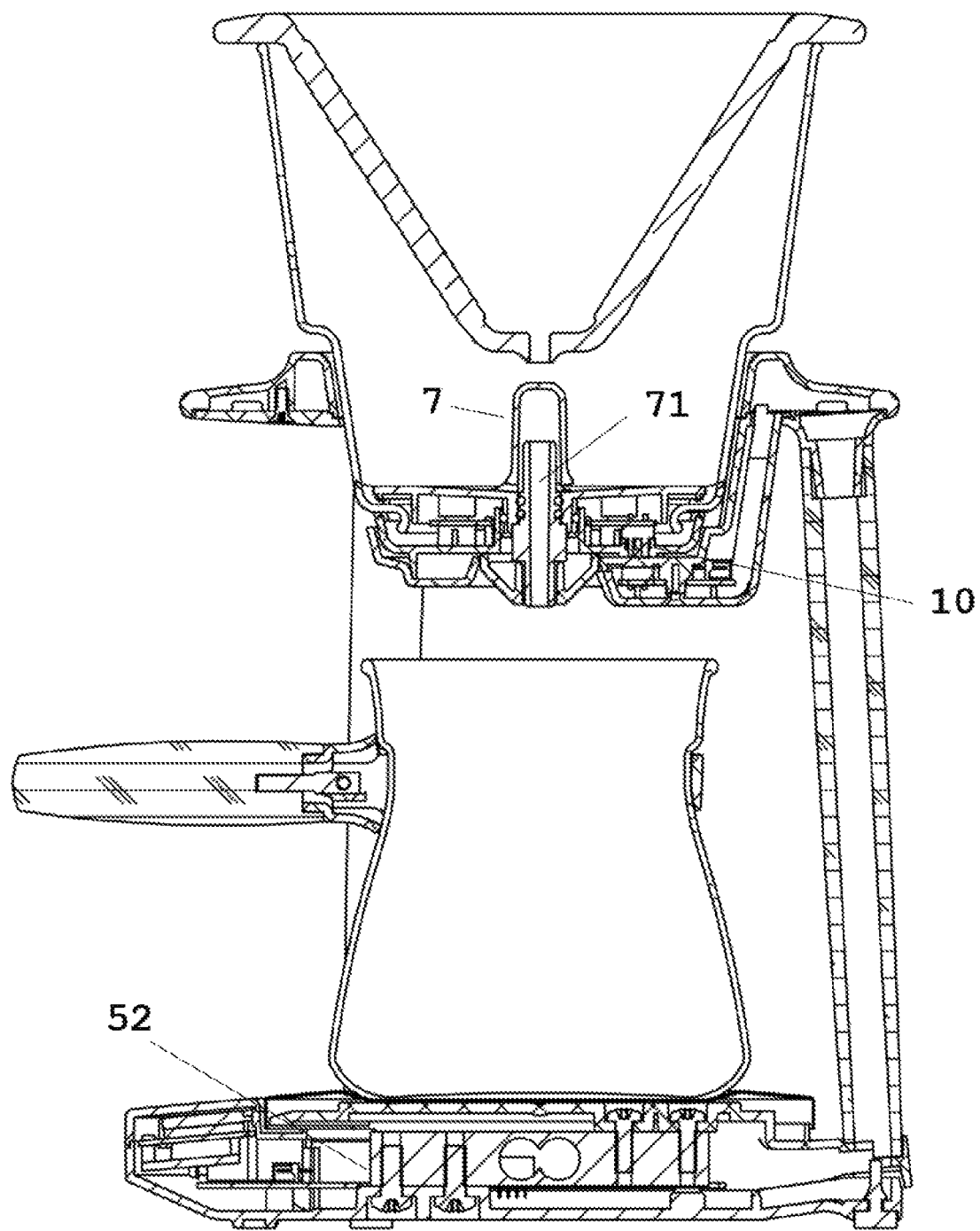
FIG. 2 shows the cross-sectional view the embodiment in FIG. 1 having a fluid transfer system (7) comprising a tube (71) traversing the bottom the measurement chamber for brewed coffee to accumulate over the level of the tube to exit the measurement chamber and flows into the carafe below. A pogo pin (10) allows the electrical circuitry to be re-established when the upper structure is placed onto the filter holder. As coffee ground or water is introduced into the coffee maker, a weight sensor (52) in the lower structure will measure weight changes.
Figure 3:
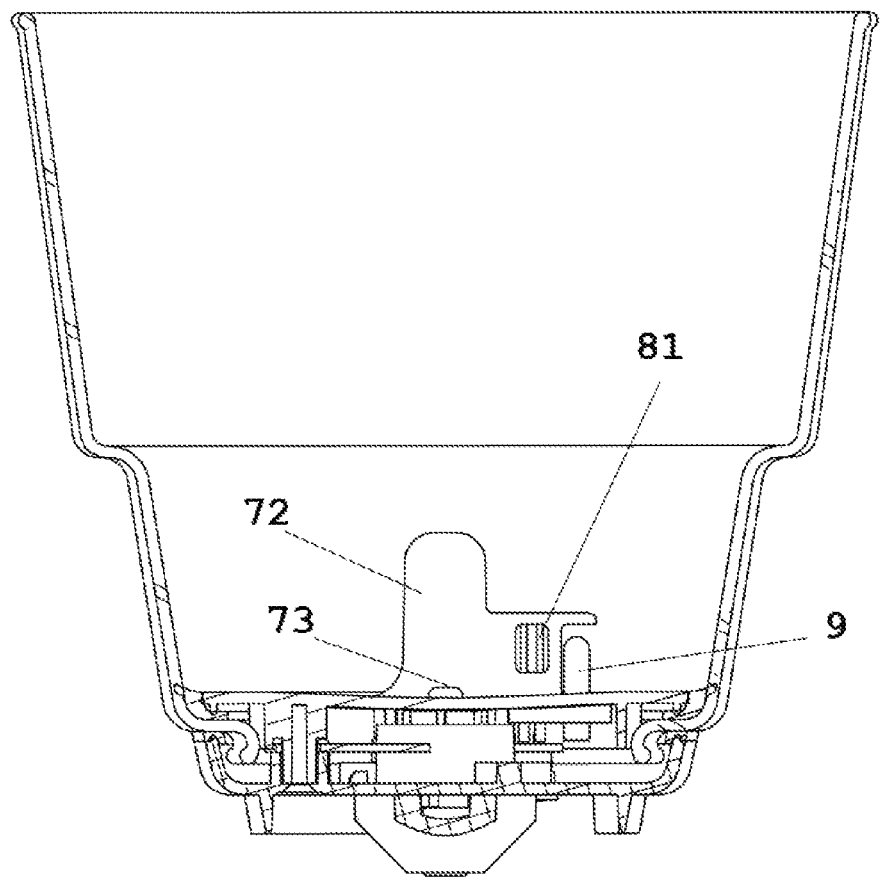
FIG. 3 shows the cross-sectional view of the upper structure detached from the filter holder. Next to the tube that is now shown enclosed in a case (72) having an inlet (73) at the bottom is a TDS sensor having two TDS pins (81) and a temperature sensor (9).
Figure 4:
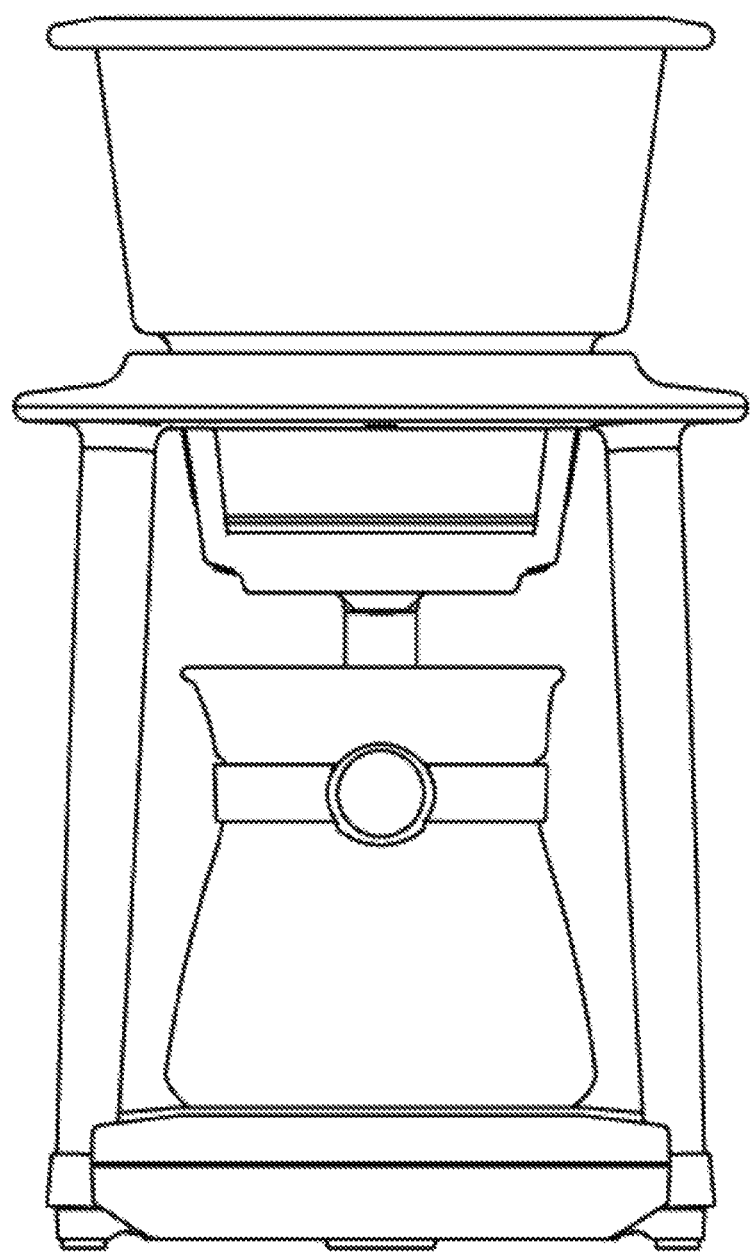
FIG. 4 shows the front view of the coffee maker with TDS measurement.
Figure 5:
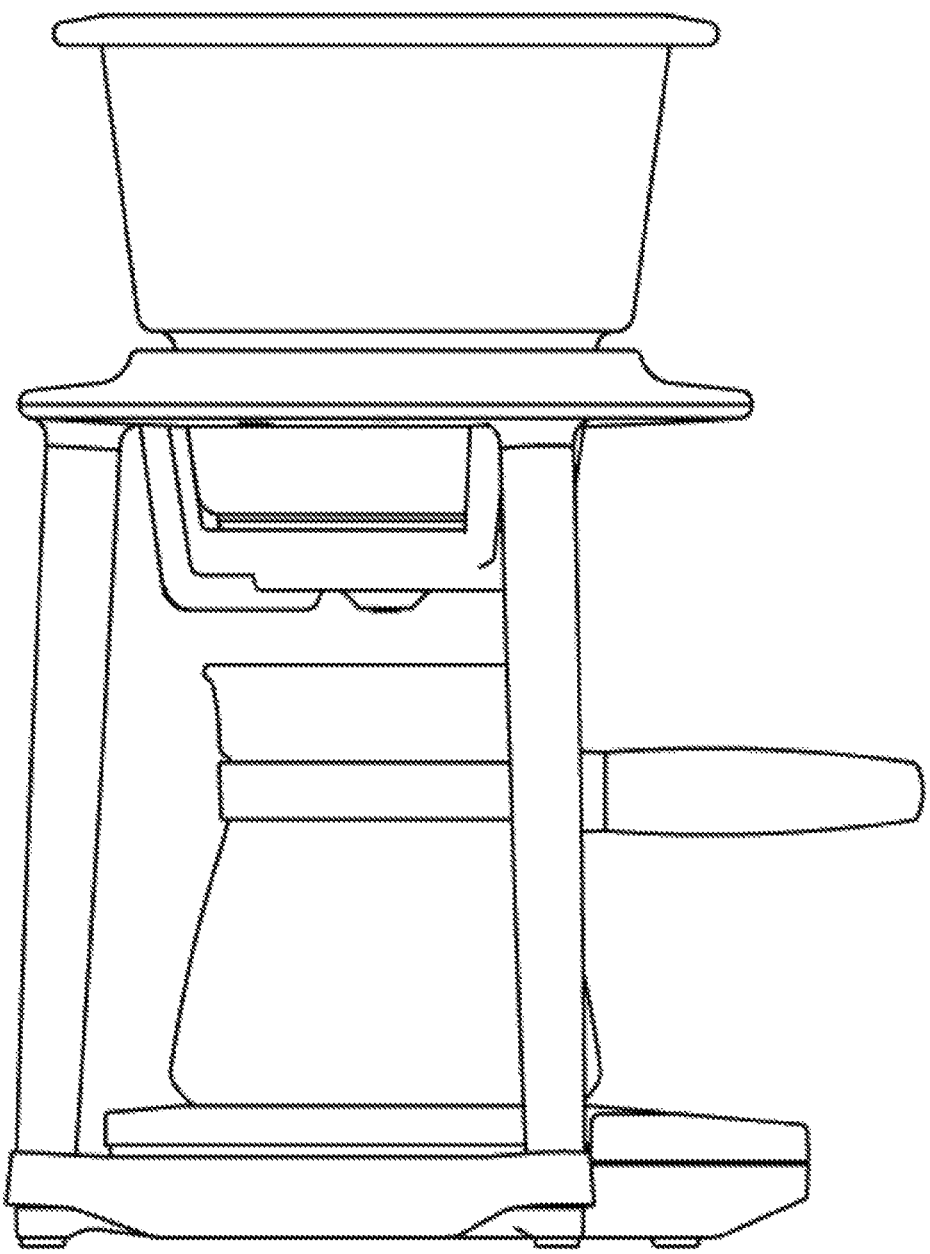
FIG. 5 shows the side view of the coffee maker with TDS measurement.
Figure 6:
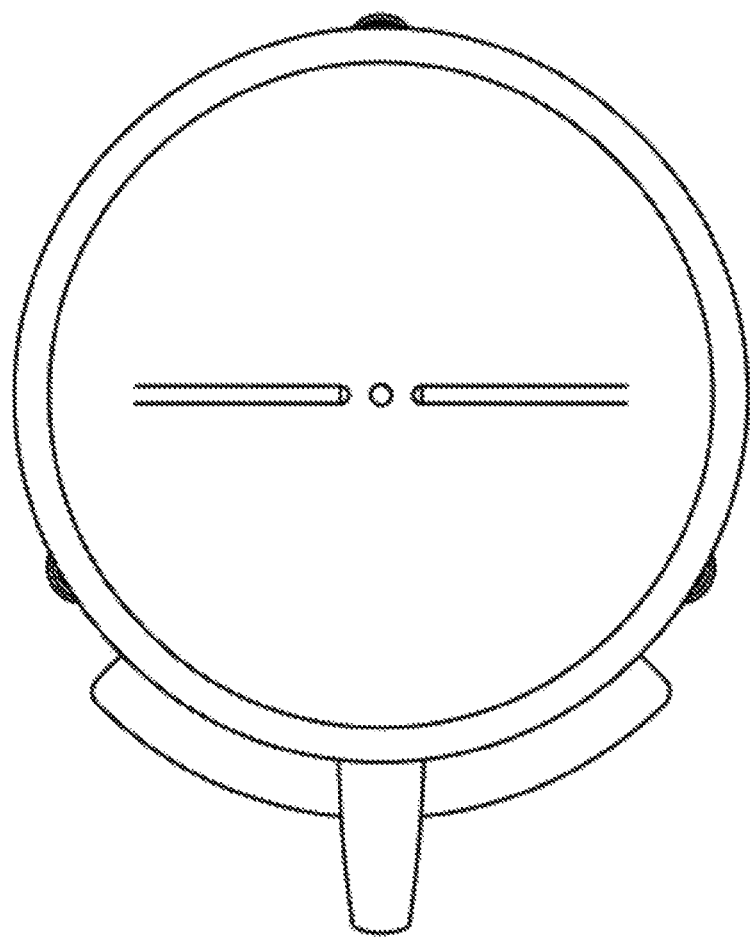
FIG. 6 shows the top view of the coffee maker with TDS measurement.
Figure 7:
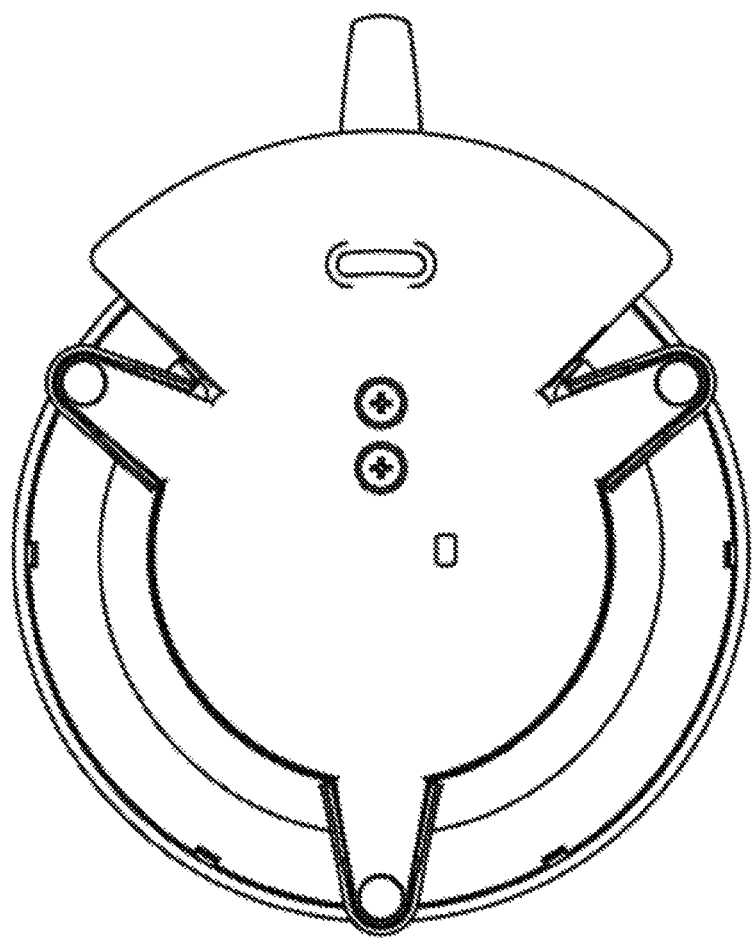
FIG. 7 shows the bottom view of the coffee maker with TDS measurement.

FIG. 2 shows a cross-section of the coffee maker. The brewed coffee enters the measurement chamber (2). A fluid transfer system (7) comprising a tube (71) traversing the bottom the measurement chamber (2) allows brewed coffee accumulated over the level of the tube to exit the measurement chamber (2) and flows into the carafe (6) below. FIG. 3 shows the cross-section of the measurement chamber (2) at another angle. Next to the tube that is now shown enclosed in a case (72) having an inlet (73) at the bottom is a TDS sensor (8) and a temperature sensor (9). The TDS sensor for this embodiment comprises two parallel pins (81) that are separated by a certain distance so as to measure conductivity of the brewed coffee. In this embodiment, the pins are made of titanium while the temperature sensor is a NTC. By having the fluid transfer system, TDS sensor and temperature sensor located closely together, the coffee maker of this invention ensures that the measured TDS value is truly reflective of the brewed coffee leaving the measurement chamber to enter the carafe. In another embodiment, the TDS sensor may be a refractometer. Due to the design of the fluid transfer system, brewed coffee will accumulate to at least the level of the tube which will fully submerge the TDS sensor and temperature sensor for accurate measurement of the TDS value. For easy cleaning of the filter and measurement chamber, the entire structure above the filter holder is detachable as shown in FIG. 3. A pogo pin (10) allows the electrical circuitry to be re-established when the upper structure is placed onto the filter holder.

As coffee ground or water is introduced into the coffee maker, a weight sensor (52) in the lower structure (5) will measure weight changes. The data collected from the coffee maker can be displayed on the panel (51) on the coffee maker or wirelessly communicated to a mobile device. The taste profile may be tabulated based on these data by the coffee maker or the mobile device.

What is claimed is:

1. A coffee maker comprising:
   a) an upper structure comprising a filter (1) and a measurement chamber (2); said measurement chamber (2) comprises a TDS sensor (8), a temperature sensor (9) and a fluid transfer system (7);
   b) a lower structure comprising a weight sensor (52);
   c) a plurality of connecting elements (4) enacting said upper structure above said lower structure; and
   d) a carafe (6) to be placed between said upper structure and lower structure; and
   e) a display panel (51) showing data from said TDS sensor temperature sensor, or weight sensor;
      wherein said fluid transfer system (7) comprises a tube (71) traversing the bottom of said measurement chamber (2) and protruding a segment into the measurement chamber (2), said segment has a height higher than said TDS sensor (8); wherein said measurement chamber (2) further comprises a case (72) for housing said TDS sensor (8), said temperature sensor (9) and said fluid transfer system (7); said case (72) has an inlet (73) at the bottom next to said TDS sensor (8) and temperature sensor (9).

2. The coffee maker of claim 1, wherein said upper structure further comprises a filter holder (3), said filter and measurement chamber are detachable from said filter holder, said filter holder and said measurement chamber establish electrical contact by a connector.

3. The coffee maker of claim 2, wherein said connector is a pogo pin.

4. The coffee maker of claim 1, wherein said TDS sensor comprises two parallel pins for measuring conductivity.

5. The coffee maker of claim 1, wherein said TDS sensor is a refractometer.

6. The coffee maker of claim 1, wherein said temperature sensor is a NTC.

7. The coffee maker of claim 1, wherein said fluid transfer system comprises a siphon.

8. The coffee maker of claim 1, wherein said lower structure comprises a display panel.

9. The coffee maker of claim 1, further comprising a wireless communication module for communicating with a wirelessly connected device.

10. A method for using the coffee maker of claim 1 to obtain TDS value of a brewed coffee, comprising the steps of:
  a) adding an amount of coffee ground to said filter, said amount of coffee ground is measured by said weight sensor;
  b) adding an amount of hot water to said filter to form brewed coffee, said amount of hot water is measured by said weight sensor; and
  c) allowing said brewed coffee to flow through said fluid transfer system for said TDS sensor and said temperature sensor to make measurement; and
  d) displaying a TDS value of said brewed coffee on a display panel.

* * * * *